June 15, 1971   J. M. JAMISON   3,584,381
TREE TRIMMING AND PRUNING DEVICE
Filed Jan. 29, 1968   5 Sheets-Sheet 1

INVENTOR
JOE M. JAMISON
BY Robert M. Dunning
ATTORNEY

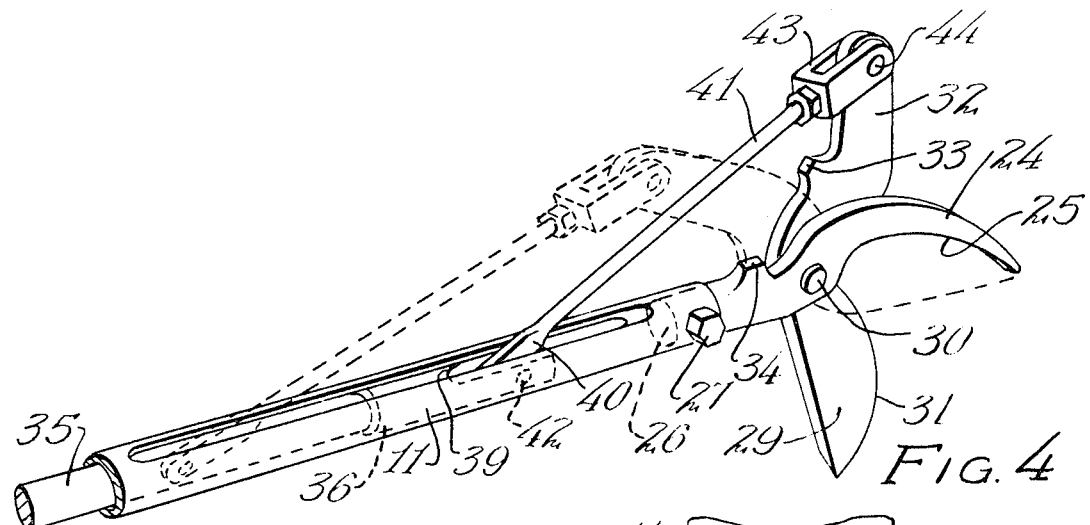
FIG. 4
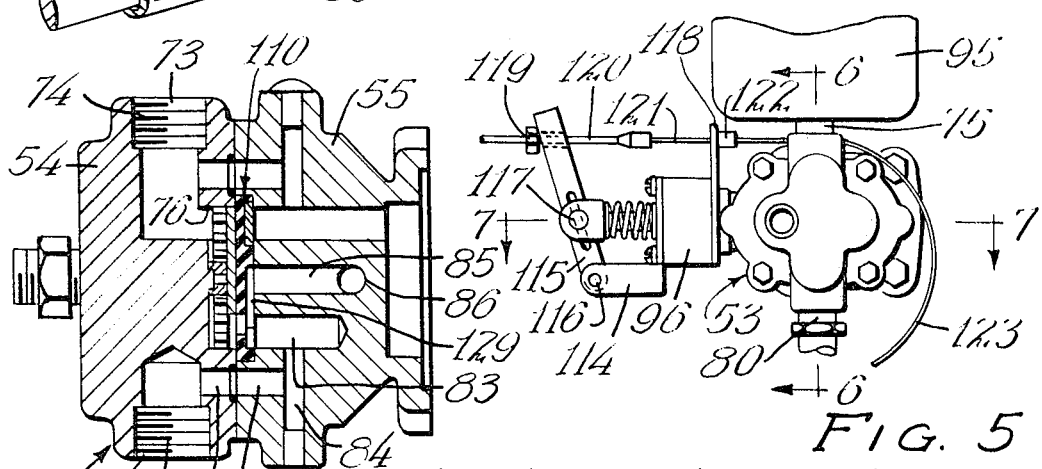
FIG. 5
FIG. 6
FIG. 7
INVENTOR
JOE M. JAMISON
BY Robert M. Dunning
ATTORNEY June 15, 1971  J. M. JAMISON  3,584,381
TREE TRIMMING AND PRUNING DEVICE
Filed Jan. 29, 1968  5 Sheets-Sheet 3

INVENTOR
JOE M. JAMISON
BY Robert M. Dunning
ATTORNEY

June 15, 1971  J. M. JAMISON  3,584,381
TREE TRIMMING AND PRUNING DEVICE
Filed Jan. 29, 1968  5 Sheets-Sheet 4

INVENTOR
JOE M. JAMISON
BY Robert M. Dunning
ATTORNEY

INVENTOR
JOE M. JAMISON

BY Robert M. Dunning

ATTORNEY

United States Patent Office 3,584,381
Patented June 15, 1971

3,584,381
TREE TRIMMING AND PRUNING DEVICE
Joe M. Jamison, Webster, Wis. 54893
Continuation-in-part of application Ser. No. 501,928, Oct. 22, 1965, now Patent No. 3,409,983. This application Jan. 29, 1968, Ser. No. 701,327
Int. Cl. B26b 15/00
U.S. Cl. 30—228                    6 Claims

ABSTRACT OF THE DISCLOSURE

This invention relates to a completely self-contained portable tree trimming and pruning device for tree branches and the like. The device includes a pair of shearing blades which are hydraulically operated by a hydraulic cylinder. A light weight internal combustion engine drives a hydraulic pump through a suitable valve. Fluid from a reservoir normally flows through the pump and valve back to the reservoir. Actuation of the valve forces the fluid to the cylinder to close the shearing blades.

This is a continuation-in-part of application Ser. No. 501,928, filed Oct. 22, 1965, which became Pat. No. 3,409,983 on Nov. 12, 1968.

This invention relates to an improvement in tree trimming and pruning device, and deals particularly with a completely self-contained and portable means of trimming branches from trees and other woody growth during a trimming or pruning operation.

Various devices have been produced for cutting branches from trees in trimming the trees or pruning them. When carrying on this operation well above the surface of the ground, cooperable cutting jaws have been mounted on the ends of poles. These cutting jaws usually include a concavely curved fixed blade and a cooperable convexly curved movable blade. Link means are connected to the movable jaw and extend longitudinally of the pole for attachment with an operating lever of one type or another. The movable jaw may be pivoted by means of this mechanism to cut off a branch located between the jaws.

While devices of this type function quite effectively for branches of very small diameter, the effectiveness decreases as the size of the branch increases. It is often somewhat difficult to hold the cutting jaws of the device in proper position while also manipulating the operating lever. As a result, curved tree saws mounted upon the ends of operating poles have usually been found more effective and easier to operate than the cutting jaws when the branch being removed is of substantial diameter.

I have found that if a lightweight power unit is mounted on the lower end of an elongated pole, branches of quite considerable size may be trimmed off just about as quickly as the jaws may be moved from one branch to another. With a device of this type, both of the hands may be used to guide the position of the pole, and the actual cutting operation requires only the operation of a suitable trigger. While the device is obviously heavier than a hand-operated device, it can readily cut off branches of considerably greater diameter than are practical to cut with a manually operated device so that trimming may be actually completed in a fraction of the time previously required with a manually operated device. In view of the fact that it is possible to cut off two or three branches with the power-driven device in the time usually required to trim a single branch with a manual tool, much less work and effort is involved. Furthermore, and more important, the power-driven device will cut off branches which would be virtually impossible to cut off by a manually operable jaw-type tool. Insofar as I am aware, no completely self-contained portable device of this type is available which may be readily carried about for manipulation by the operator.

A feature of the present invention resides in the provision of a power-driven trimming and pruning device which may be easily handled and manipulated. The power unit which is employed is extremely light in weight, and will operate for several hours on a tank of fuel having a capacity of sixteen liquid ounces. The internal combustion engine drives a small fluid pump which circulates fluid from a reservoir through the fluid system and back to the reservoir. When the operating trigger is closed, the fluid under pressure is directed against a piston in a cylinder, the piston being connected by a suitable linkage to the movable jaw of the cutting head. Fluid pressure thus closes the jaws and acts to cut off a branch positioned between the jaws. The cutting head will cut off branches ranging in size to the full capacity of the jaws. As an example, a branch which is an inch and a half in diameter may be cut off virtually as quickly as a branch one-half inch in diameter, and with no more effort.

A further feature of the present invention resides in provision of a device of the type described in which the power unit is supported on the lower end of a pole between portions of the pole designed to be grasped by the hands. Due to the fact that the major portion of the weight of the device is located in this manner, the position of the pole may be readily changed and the cutting jaws may be quickly and readily moved from one position to another.

In the drawings forming a part of the specification:

FIG. 4 is a perspective detail of the cutting head, showing the manner in which the movable jaw may swing from open to closed position relative to the fixed jaw.

FIG. 5 is a top plan view of the pump and valve operating mechanism illustrated in FIG. 1.

FIG. 6 is a sectional view through the pump and valve mechanism, the position of the section being indicated by the line 6—6, of FIG. 5.

FIG. 7 is a section through the pump and valve mechanism on a plane at right angles to the plane of FIG. 6, the position of the section being indicated by the line 7—7 of FIG. 5.

Figure 2:
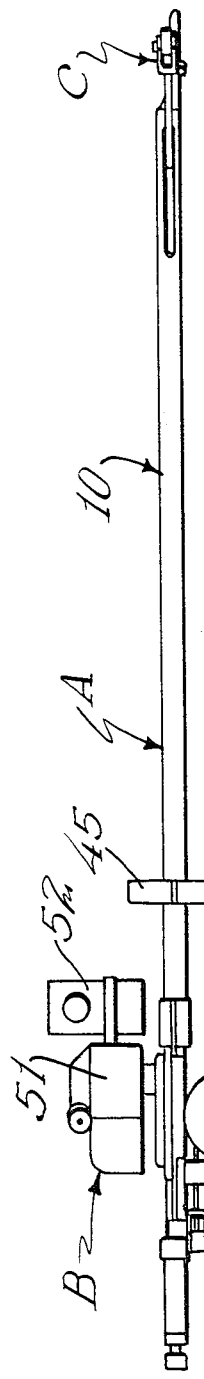
FIG. 2 is a top plan view of the same.

In general, the trimming and pruning device is indicated in general by the letter A. The device A comprises an elongated tubular support 10 having a power unit B mounted at one end thereof, and a cutting or shearing head C mounted at the opposite end thereof.

The supporting pole or standard 10 includes a hollow tubular pole 11 equipped at one end with an internally threaded socket 12 designed to accommodate a nipple 13 which is also threaded through the reduced diameter end 14 of a hydraulic cylinder 15. The cylinder end 14 is sealed relative to the nipple 13 by a cap 16 which may contain the necessary packing material. The end of the cylinder 15 opposite the reduced diameter end 14 is provided with a second reduced diameter end 17 which is secured to a tubular handle 19. An apertured cap 20 is threaded onto the extremity of the tubular handle 19 and is provided with an internally threaded coaxial nipple 21 designed for attachment with an angular fitting or elbow 22. A tubular handle grip 23 encircles the handle shank 19.

The cutting head C includes a fixed jaw or blade 24 having a concave cutting edge 25, and having a shank 26 which telescopes into the extremity of the tubular member 11 and is secured thereto by a bolt 27 or other suitable means. A movable blade or jaw 29 is pivotally connected to the fixed jaw 24 by a pivot 30, and has a convex sharpened cutting edge 31 which cooperates with the concave cutting edge 25 to cut the branches or similar material therebetween. The movable jaw 29 is provided with a lateral extension 32 beyond the pivot bolt 30 by means of which the jaw may be pivoted. A lug 33 on the extension 32 is cooperable with a lug 34 adjoining the shank 26 of the fixed jaw 24 to limit pivotal movement of the movable blade 29 when the two jaws are closed.

Figure 1:
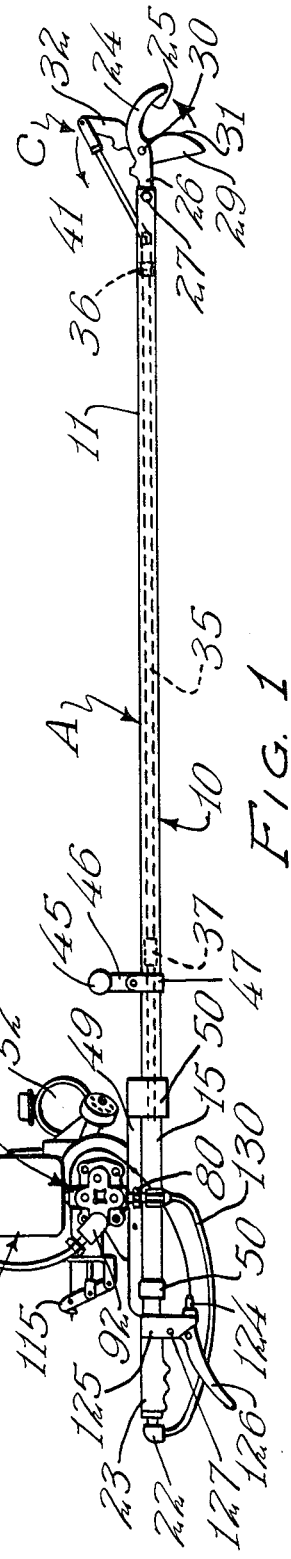
FIG. 1 is a side elevational view of the trimming device in readiness for use.

A rod 35 is freely slidable in the tubular pole 11. A bearing sleeve 36 encircles the end of the rod 35 and slides within the tubular pole 11. As indicated in FIG. 1 of the drawings, a second bearing sleeve 37 may encircle the rod 35 near the opposite end of the pole to act as a slide guide therefor.

As indicated in FIG. 4 of the drawings, the end of the rod 35 is longitudinally and diametrically slotted as indicated at 39 and accommodates the flat end 40 of a link 41. The link 41 is pivotally attached to the rod 35 by a transverse pivot 42. A clevis 43 is mounted on the opposite end of the link 41. The clevis 43 straddles the lateral extension 32 of the movable jaw 29 and is pivotally connected thereto by means of a pivot 44. FIG. 4 shows the jaw 29 in full lines in open position and in dotted lines in closed position.

A transverse handle 45 is connected to the pole 10 by means of a bracket arm 46 supported by a clamp 47 encircling the pole 10 at a point spaced from the handle 23, and on the opposite side of the cylinder 15. In operation, the operator grasps the handle 45 with one hand and the handle 23 with the other to manipulate the device.

The power unit B is mounted upon a bracket 49 supported by clamps 50 which encircle the pole and handle, the bracket 49 extending along the cylinder 15. The power unit B includes a small lightweight internal combustion engine 51 having attached thereto a small fuel tank 52. While the drive from the engine 51 is not shown in detail, it operates a pump and valve unit 53 which is best illustrated in FIGS. 5 through 10 of the drawings.

The hydraulic pump and valve mechanism is composed of a housing including two main parts 54 and 55 (FIGS. 6 and 7) arranged with pump gears generally between the two housing sections. The pump drive shaft 56 extends from the engine 51 through a sealing plate 57 in the housing section 55, and is supported by suitable bearings 59 and 60 in the housing sections 54 and 55 respectively. The bearing 59 is located in a socket 61 in the housing section 54, the socket being aligned with the passage 62 in the housing section 55 through which the drive shaft 56 extends. A pump gear 63 is mounted upon, or is integral with, the shaft 56. One surface of the gear 57 rides against a flat face 64 of the housing section 54, and is held from axial movement in one direction thereby.

Figure 9:
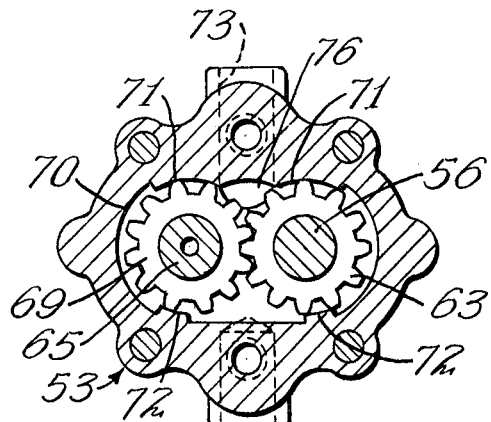
FIG. 9 is a sectional view through the pump and valve mechanism, the position of the section being indicated by the line 9—9 of FIG. 7.

A parallel shaft 65 is supported between the housing sections 54 and 55, being supported by aligned bearings 66 and 67 therein. A pump gear 69 encircles the shaft 65 and is integral thereto or secured for rotation therewith. The gear 69 meshes with the gear 63 to provide a gear pump. As is indicated in FIG. 9 of the drawings, the gears 63 and 69 are located in a pump chamber 70 which is closely adjacent to the gears at least in areas 71 near the pump inlet and areas 72 near the pump outlet.

As indicated in FIG. 6 of the drawings, the pump inlet 73 extends into the top of the housing section 54, and the inlet is internally threaded as indicated at 74 to accommodate the nipple 75. The inlet 73 is laterally offset from the pump chamber, and is connected thereto by a laterally extending passage 76. The pump outlet 77 is aligned with the inlet 73, and is internally threaded as indicated at 79 to accommodate a suitable fitting indicated in FIG. 1 at 80. A lateral passage 81 extends from the outlet 77 to a registering passage 82 in the housing section 55. The housing section 55 includes a pump discharge passage 83 which communicates with the passage 82 through a connecting passage 84. Thus the discharge of the pump is continually connected to the pump outlet 77.

Midway between the shafts 56 and 65, the housing section 55 is provided with a passage 85 which, as indicated in FIG. 7 of the drawings, is connected by a lateral passage 86 to a chamber 87 located above the shaft 65. The shaft 65 is hollow or is provided with an axial aperture 89 extending therethrough through which fluid may flow. The housing section 54 is provided with a chamber 90 at the lower end of the shaft 65 communicating with an internally threaded bypass port 91. This bypass port 91 is designed to accommodate a suitable fitting 92 (see FIG. 1) connected by a flexible tube 93 to a cooperable fitting 94 on a reservoir 95. The nipple 75 connects the pump inlet 73 with the reservoir 95.

A bearing block 96 is secured to the housing section 55 having a cylindrical bore 97 extending therethrough which is aligned with the passage 86. The block 96 is provided with an externally threaded sleeve 98 which is threaded into an internally threaded aperture 99 in the housing section 55. The bore 97 is provided with an outer end portion 100 of slightly reduced diameter, providing a shoulder or abutment 101 between the two sections of the bore. A plunger 102 is provided with a bearing portion 103 which is slidable in the larger diameter inner portion of the bore 97, and is limited in its outward slidable movement by the abutment 101. The plunger 102 is provided with a clevis 104 on its outer end, and a spring 105 is interposed between the clevis 104 and the block 96 to normally urge the bearing portion 103 against the abutment 101. The inner end of the plunger 102 is provided with a coaxial shank 106 of smaller diameter than the plunger, and a spring 107 encircles the shank 106 and is attached thereto. A valve element 108 is mounted upon the opposite end of the spring 107. The valve element 108 includes a shank portion which extends into the inner end of the spring and is secured thereto. A peripheral flange 109 having a tapered seat on its inner surface completes a valve element. When the plunger is forced inwardly, compressing the spring 105, the rounded forward end of the valve element 108 enters the passage 86 in the valve flange 109 engages the wall of the housing encircling the passage 86 to effectively close this passage.

Figure 10:
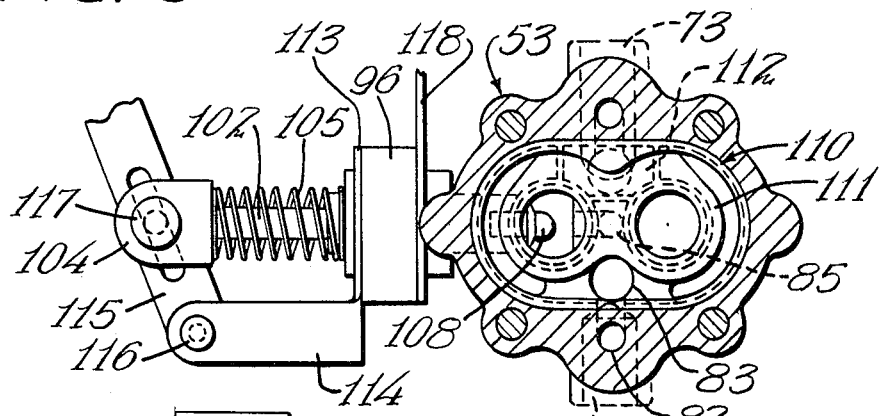
FIG. 10 is a view similar to FIG. 8, but showing the sealing gasket in place therein.

As is indicated in FIG. 10, a resilient gasket 110 having an integrally attached metal plate 111 thereupon provides a seal between the gears 63 and 69 and the top of the pump chamber, the metal plate being in contact with the surfaces of the gears. As is indicated in FIG. 10 of the drawings, the gasket is shaped to provide communication between the central aperture 85 and the passage 83 connected by the line passages 81 and 82 to the outlet port 77. The pump housing section 55 accommodates a plate 112 so that the liquid entering the inlet 73 must be carried by the gears 63 and 69 to the outlet port which has been described.

In other words, the gear pump formed by the gears 63 and 69 are mounted in a pump chamber which acts to drive the hydraulic fluid from the inlet to the outlet in the manner well known in the gear pump field. The gasket 110 and the plates 111 and 112 merely simplify the formation of the pump chamber and act as a seal between the pump gears and the housing.

As indicated in FIGS. 1, 7 and 10 of the drawings, a bracket plate 113 is bolted or otherwise secured to the bearing block 96, and this plate 113 supports a pair of outwardly extending parallel bracket arms 114. A lever 115 is pivotally connected between the arms 114 as indicated at 116, and the lever 115 is pivotally and slidably connected to a pivot pin 117 straddling the bifurcated end of the clevis 104. The free end of the lever 115 is pivotally connected at 119 to a wire anchor member 120 attached to the end of a flexible wire 121. A cable anchor 122 is mounted upon the plate 118 and anchors one end of a flexible cable 123 which extends along the cylinder 15 to a cooperable bracket 124 secured adjoining secured to a bracket 125 attached to the tubular handle 19 near the handle grip 23. A trigger 126 is pivotally secured at 127 to the bracket 125. Pivotal movement of the trigger 126 will slide the wire 121 within the cable 123, acting to pivot the lever 115 connected to the plunger 102. Movement of the handle 126 in a clockwise direction as viewed in FIG. 1 acts to pivot the lever 115 in a clockwise direction, forcing the plunger 102 to the right as indicated in FIGS. 7 and 10 and acting to close the opening 86 through which the hydraulic fluid is bypassing to the reservoir through the fitting 92 and flexible hose 93.

Thus it will be noted that in normal operation of a pump, fluid is pumped by the gears 63 and 69 to the intermediate passage 85 and the angular passage 86 to the chamber 87. The chamber 87 is connected to the chamber 90 through the hollow shaft 66 so that when the valve 108 is in the open position illustrated, the pump is merely pumping hydraulic fluid from the reservoir 95, through the pump and valve mechanism, and back to the reservoir.

However, when the passage 86 is closed by the valve 108, the fluid under pressure flows from the pump chamber through the passage 83, 84, 82 and 81 to the outlet 77, which is connected to the cylinder 15 in a manner which will be explained. The transverse passage between the gasket 110 and the housing section 55 is indicated at 129 in FIG. 6 of the drawings.

Figure 3:
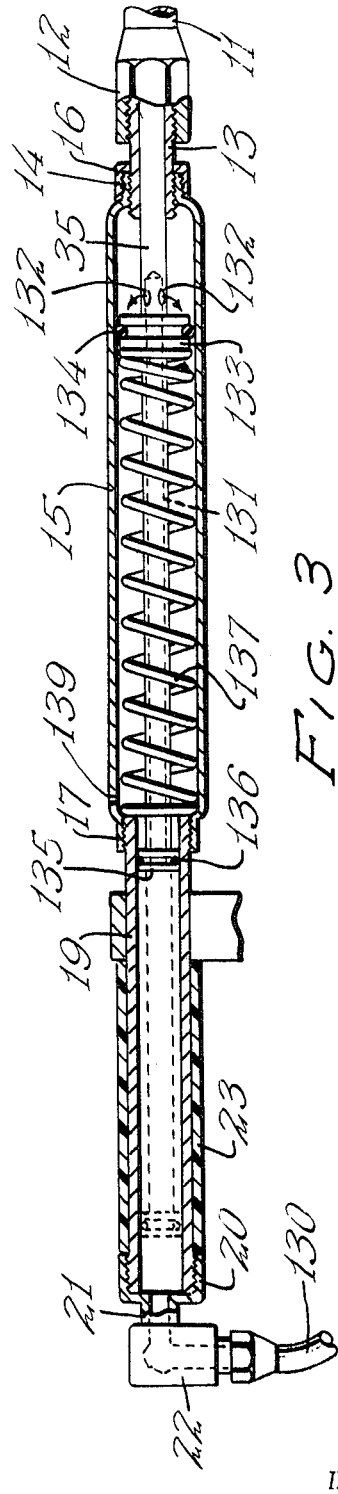
FIG. 3 is a sectional detail of a piston arrangement used in the apparatus shown in FIGS. 1 and 2.
Figure 8:
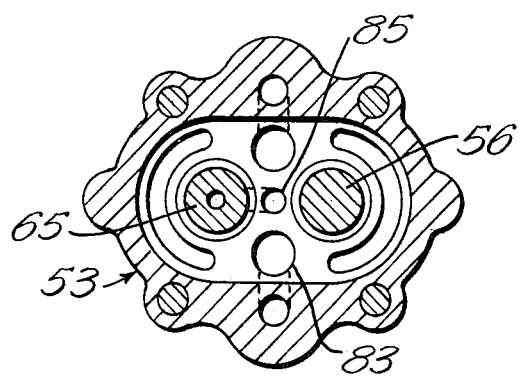
FIG. 8 is a sectional view through the pump and valve mechanism, the position of the section being indicated by the line 8—8 of FIG. 7.

There are several ways of reciprocating the rod 35 within the pole 10. One such arrangement is indicated in FIG. 3 of the drawings. The outlet fitting 80 is connected by a flexible tube 130 to the elbow 22 at the end of the hollow handle 19. The innermost end of the rod 35 is provided with an axial passage 131 extending therethrough, the passage 131 extending through the portion of the rod enclosed within the tubular handle 19 and terminating in angularly spaced openings 132. A piston 133 is mounted upon the rod 35 to the left of the openings 132 as viewed in FIG. 3. The piston 133 is sealed with respect to the inner wall of the cylinder 15 by suitable sealing means 134. A second piston 135 is slidably supported in the tubular handle 19, and is sealed with respect to the wall of the handle by a sealing ring 136 or other suitable means. The piston 133 is slidable within the cylinder 15 while the piston 135 is slidable inside the tubular handle 19. A spring 137 normally urges the rod 35 to the right as viewed in FIGS. 1 and 3. In this position the jaws of the cutter head are spread apart or are in open position.

When fluid under pressure is directed from the pump through the elbow 22 and into the left hand end of the tubular handle 19, it is free to flow through the passage 131, and through the openings 132 into the right hand end of the cylinder 15. This fluid forces the piston 133 to the left from the position shown in FIG. 3, the force against the piston 133 greatly exceeding the opposite force against the piston 135. The fluid thus draws the rod 35 to the left. This movement acts through the link 41 to pivot the movable jaw 29 toward the fixed jaw 24, sharing a branch or similar object positioned between the jaws.

In view of the fact that the pistons 133 and 135 are sealed against the walls of the cylinder and handle respectively, there should be no fluid between these pistons. The left hand end of the cylinder 15 may be provided with a vent 139 to prevent the compression of air in the left hand end of the cylinder 15 as the spring 137 is compressed.

Figure 11:
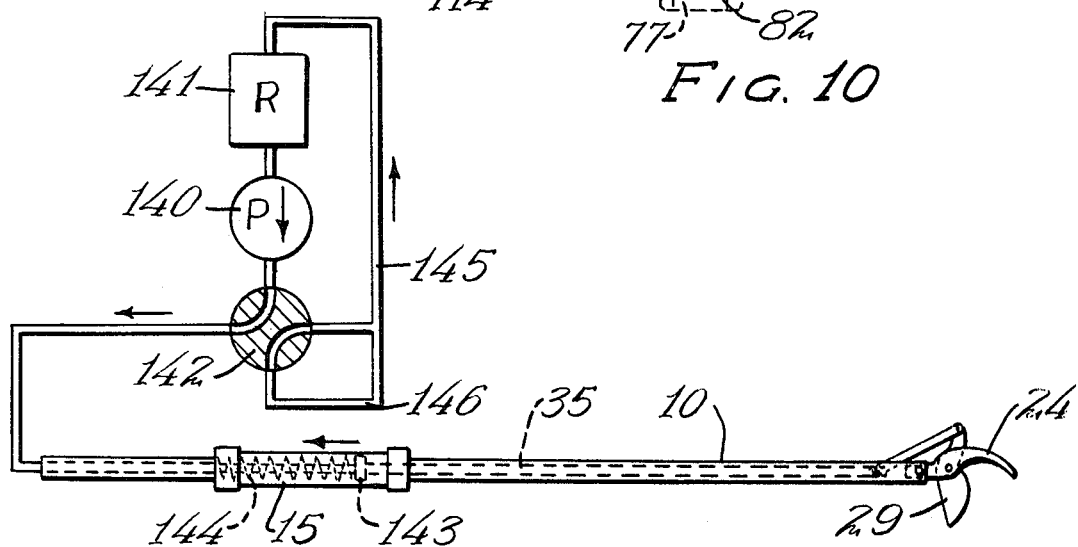
FIG. 11 is a diagrammatic view of the control system controlling the flow of fluid to and from the trimming device illustrated in FIGS. 1 to 10.

FIG. 11 of the drawings indicates diagrammatically how fluid under pressure could be controlled by a manually controlled valve of conventional type.

In the arrangement indicated in FIG. 11, a pump 140 is pumping fluid from a reservoir 141 through a valve 142 and into the cylinder 15 through the tubular end of the rod 35, the fluid acting to urge the piston 143 to the left compressing the spring 144. This action operates to urge the movable jaw 29 toward the fixed jaw 24. When the valve 142 is reversed, the fluid from the pump 140 passes through the return line 145 to the reservoir 141. The fluid within the cylinder 15 is allowed to escape to the reservoir through the bypass passage 146.

Figure 13:
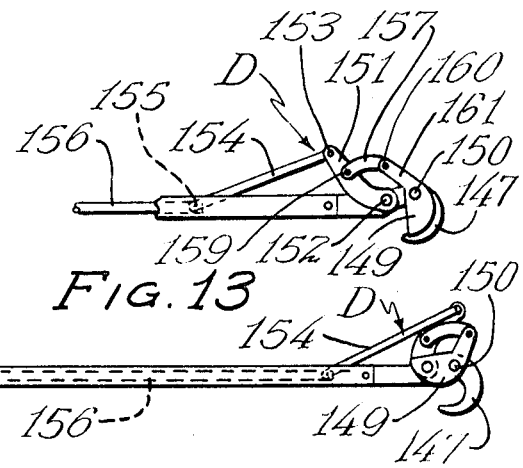
FIG. 13 is a detail view showing the cutting head in closed position.
Figure 12:
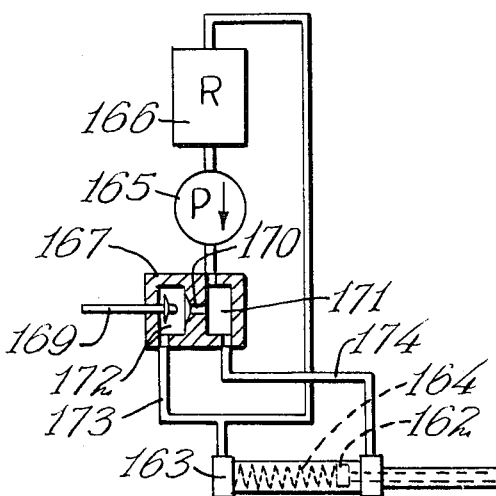
FIG. 12 is a view similar to FIG. 11, showing a slightly different form of fluid system.
Figure 12:
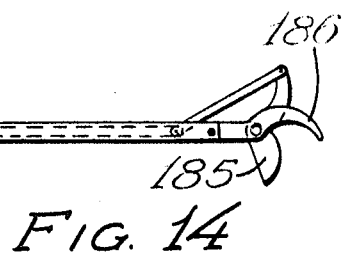

FIGS. 12 and 13 of the drawings disclose a slightly modified form of cutter head construction and a slightly modified form of hydraulic system. The cutter head D is of the compound lever type designed to close the jaws somewhat more forcefully. The cutter head D includes a hook-shaped fixed jaw 147 and a movable jaw 149 pivotally connected to the fixed jaw at 150. A lever arm 151 is pivotally connected to the fixed jaw at 152, the end of this lever 151 being pivotally connected at 153 to a link 154 pivotally connected at 155 to the operating rod 156 which is similar to the operating rod 35. A link 157 is pivotally connected at 159 to an intermediate portion of the lever 151 and at 160 to a lateral extension 161 on the movable jaw 149. With this arrangement, the force tending to close the jaws is increased due to the leverage system.

The piston 162 on the rod 156 is slidably in a cylinder 163 and is normally urged toward a jaw-open position by a spring 164. The pump 165 pumps fluid from a reservoir 166 to a valve arrangement 167 of the type described in conjunction with the arrangement illustrated in FIGS 1 to 10 inclusive. When the plunger valve 169 is in open position, fluid may flow through the lateral passage 170 from the pressure chamber 171 to the chamber 172 which is connected by a passage 173 to the left hand end of the cylinder 163 and back to the reservoir 166. Thus when the plunger 169 is in the position illustrated, the discharge from the pump 165 will be bypassed back to the reservoir 166.

When the jaws 147 and 149 are to be pivoted into the closed position indicated in FIG. 13, the valve plunger 169 is closed, closing the passage 170. Accordingly, pressure is conducted from the chamber 171 through the conduit 174 leading to the right hand end of the cylinder 163 and urging the piston 162 to the left, pivoting the cutting jaws. Fluid within the cylinder 163 is free to return to the reservoir.

Figure 14:
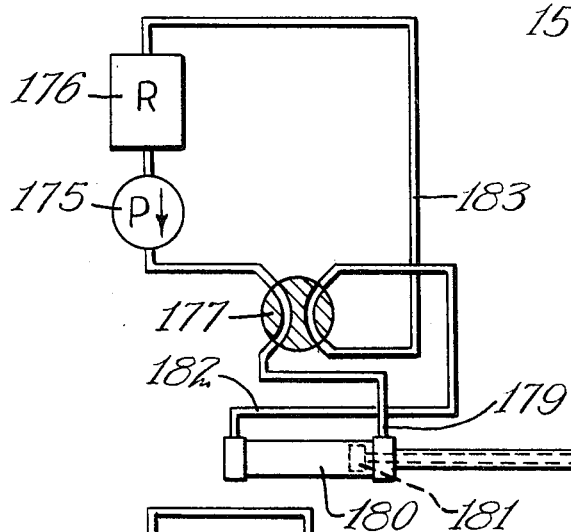
FIG. 14 is a view similar to FIGS. 11 and 12, showing a double-acting piston for operating the jaws.

FIG. 14 of the drawings illustrates diagrammatically the structure such as that illustrated in the previous patents with the exception of the fact that a double-acting cylinder is employed to selectively move the piston in either direction. The pump 175 is arranged to pump fluid under pressure from the reservoir 176 through a valve 177. In the position of the valve indicated, the fluid from the pump 175 is directed through a conduit 179 to the right hand end of the cylinder 180, sliding the piston 181 to the left as indicated in the drawing. Fluid from the left hand end of the cylinder 80 is free to flow through a return line 182 through the valve 177 to the return line continuation 183 leading through a pressure relief valve 184 to the reservoir 176. Movement of the piston 181 to the left acts to swing the movable jaw 185 toward the fixed jaw 186, cutting the branch or other object positioned between the jaws.

By rotating the valve 177 through an angle of ninety degrees, the fluid from the pump 175 will be directed through the conduit 182 to the left hand end of the cylinder 180, pushing the piston 181 to the right and opening the jaws. The fluid to the right of the piston 181 is free to flow through the return line 179 and 183 to the reservoir 176.

Figure 15:
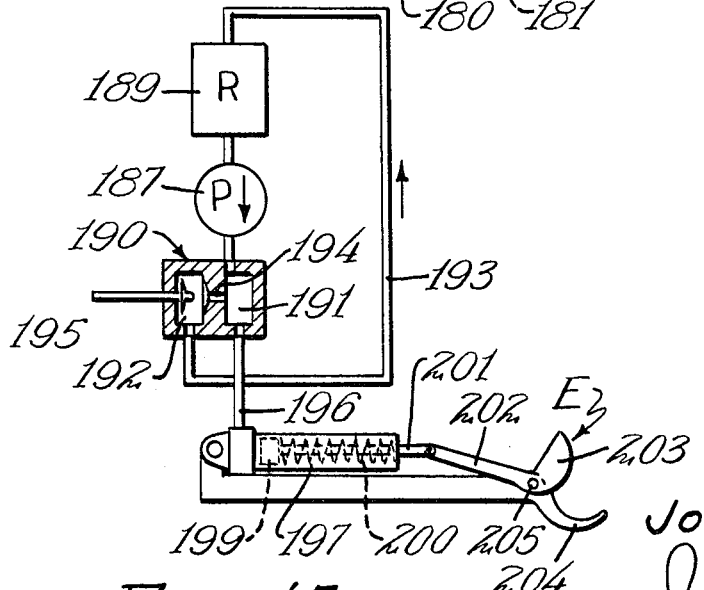
FIG. 15 is a diagrammatic view of still another form of construction in which the jaws are closed by a pushing member rather than by a pulling member as in the previous description.

FIG. 15 of the drawings shows diagrammatically an arrangement which is similar to that illustrated in FIGS. 1 to 10 of the drawings, with the exception of the fact that the jaws of the cutter head are closed by a pushing action instead of a pulling action. In this arrangement, the pump 187 pumps fluid from a reservoir 189 through a valve unit 190 similar to that described in conjunction with the systems shown in FIGS. 1 to 10 inclusive. The valve 190 includes a pressure chamber 191 and a return chamber 192 connected by the return line 193 to the reservoir 189. A lateral passage 194 normally connects the chambers 191 and 192. However, when the valve plunger 195 closes the passage 194, the fluid from chamber 191 flows through the conduit 196 to the left hand end of the cylinder 197. This action urges the piston 199 to the right compressing the spring 200. The piston rod 201 is pivotally connected to an extension 202 on the movable jaw 203 of the cutter head E. The movable jaw 203 is connected to the fixed jaw 204 by the pivot 205. Thus the jaws of the cutter head E are closed by a pushing action on the piston rod 201 rather than by a pulling action thereupon.

Figure 16:
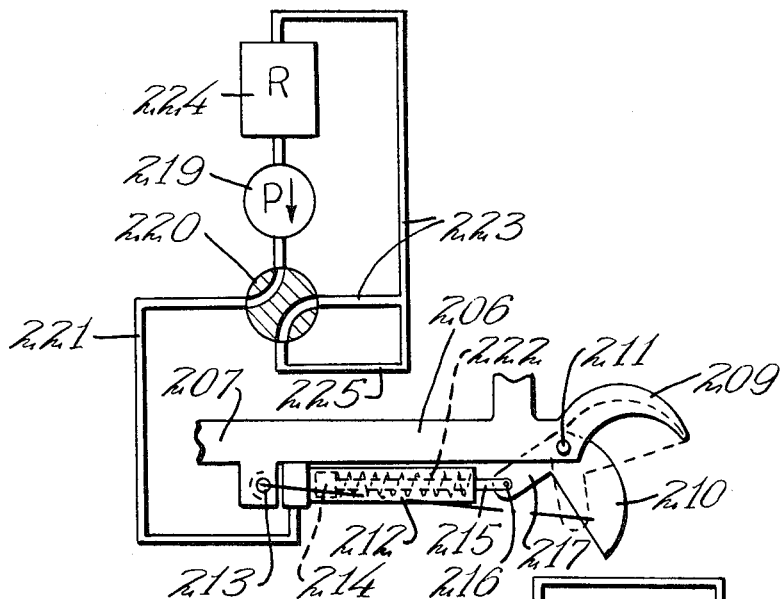
FIGS. 16, 17 and 18 are diagrammatic views of control systems wherein the piston-cylinder unit is positioned closely adjacent to the jaws.
Figure 17:
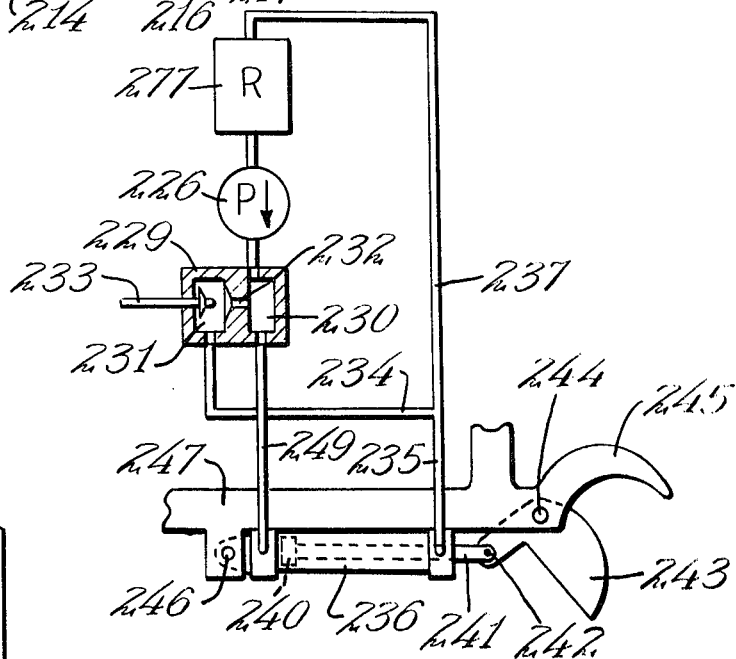
Figure 18:
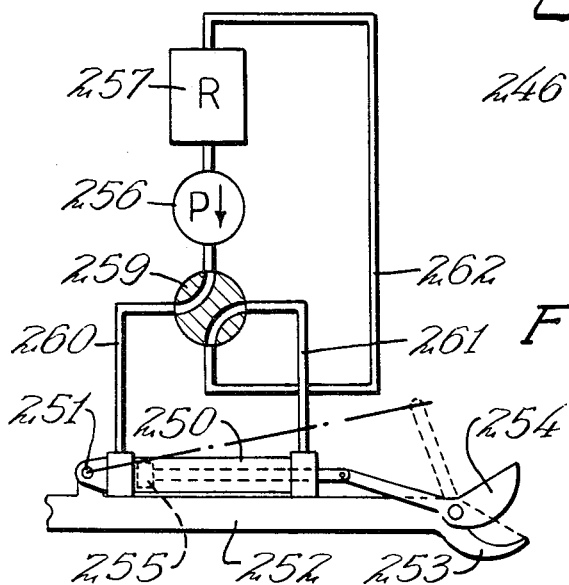

The systems shown in FIGS. 16, 17 and 18, as well as the structure shown in FIG. 15, differ slightly from previous structures in that the piston-cylinder unit which acts upon the jaws is positioned closely adjacent to the jaws. FIG. 16 of the drawings indicates a bracket 206 mounted on the end of a support 207 which may be of any suitable length. A fixed jaw 209 is mounted on the end of the bracket 206. A movable jaw 210 is hingedly connected at 211 to the jaw 209.

A cylinder 212 is pivotally connected at 213 to the bracket 206. A piston 214 is provided with a piston rod 215 pivotally connected at 216 to an angular extension 217 of the movable jaw 210. A pump 219 directs fluid under pressure through a valve 220 through a conduit 221 to the left hand end of the cylinder 212, forcing the piston to the right and compressing the spring 222, and acting to close the movable jaw 210. When the position of the valve 220 is changed, the fluid from the pump may be directed through the return line 223 to the reservoir 224. At the same time, the piston 214 may be moved to the left by the spring 222, the fluid to the left of the piston 214 being free to return through the conduits 221 and 225 to the reservoir 224.

FIG. 17 of the drawings is quite similar to FIG. 16 but indicates a valve system of the type shown in FIGS. 1 to 10 of the drawings. The pump 226 pumps fluid from the reservoir 227 to the pressure chamber 230 of the valve unit 229 which is connected to the return chamber 231 by a passage 232. When the plunger 233 is in the open position illustrated, fluid may flow from the chamber 230 to the chamber 231, and through the conduit 234 and 235 to the right hand end of the cylinder 236. A return line 237 including a pressure relief valve 239 is provided so that pressure may flow to the reservoir when the piston 240 reaches its left hand position. The piston rod 241 of the piston 240 is pivotally connected at 242 to the movable jaw 243, the jaw 243 being pivotally connected at 244 to the fixed jaw 245. The cylinder 236 is pivotally connected at 246 to the supporting bracket 247.

When it is desired to move the piston 240 to the right to close the jaw 243, the plunger 233 is moved to close the passage 232 and fluid is directed through the conduit 249 to the left hand end of the cylinder 236 to move the piston 240.

The arrangement illustrated in FIG. 18 illustrates a cylinder 250 pivotally connected at 251 to a bracket 252 supporting a fixed jaw 253 and a cooperable movable jaw 254. When the piston 255 is in the left hand position illustrated, the jaws are open. To close the jaw, fluid is forced from the pumps 256 from the reservoir 257 through the valve 259 to the conduit 260 leading to the left hand end of the cylinder 250. Fluid from the right hand end of the cylinder may flow through the conduit 261, the valve 259 and the return line 262. When the valve 259 is rotated ninety degrees, the outlet of the pump 256 is directed to the conduit 261 leading to the right hand end of the cylinder 250. This will force the piston 255 to the left, reopening the jaws 253 and 254. When the piston 255 reaches its left hand position shown, the fluid returns to the reservoir 257.

It should be noted that my device is completely self-contained and is portable to the extent that it is easily carried with comfort within the hands. The support of the device may, if desired, be supplemented by use of a shoulder harness and a swivel.

In accordance with the patent statutes, I have described the principles of construction and operation of my improvement in tree trimming and pruning device, and while I have endeavored to set forth the best embodiment thereof, I desire to have it understood that changes may be made within the scope of the following claims without departing from the spirit of my invention.

I claim:

1. A completely self-contained pruning device including an elongated tubular supporting member, a fixed shearing blade on one end of said supporting blade, a pivoted blade cooperable with said fixed blade, a cylinder forming a part of said elongated support, a piston slideable in said cylinder, a piston rod connected to said piston and extending through the major portion of the length of said elongated supporting member, link means connecting said piston rod to said pivotal blade for actuating said pivotal blade, a self-powered motor driven hydraulic pump secured to said elongated support near the other end thereof and connected to said cylinder to selectively actuate said piston, and supporting handle means on said elongated support on longitudinally opposite sides of said pump.

2. A completely self-contained pruning device including an elongated tubular supporting member, a fixed shearing blade on one end of said supporting blade, a pivoted blade cooperable with said fixed blade, a cylinder forming a part of said elongated support, a piston slideable in said cylinder, a piston rod connected to said piston and extending through the major portion of the length of said elongated supporting member, link means connecting said piston rod to said pivotal blade for actuating said pivotal blade, a self-powered motor driven hydraulic pump secured to said elongated support near the other end thereof and connected to said cylinder to selectively actuate said piston, a second cylinder of substantially smaller diameter than the first communicating with and coaxial with, the first named cylinder at the other end of said elongated support, a second piston on said piston rod slideable in said second cylinder means connecting said pump to the end extremity of said elongated support at said other end thereof, the portion of said piston rod supporting said pistons having a passage therethrough communicating with the interior of said just named cylinder beyond said pistons, whereby fluid under pressure introduced into said second cylinder may flow through said passage past said pistons and into said first named cylinder to move said piston rod in a direction against the pressure acting upon said second piston in said second cylinder.

3. The structure of claim 2 and including spring means interposed between said first named piston and the end of said first named cylinder nearest to said other end of said elongated support.

4. The structure of claim 2 and including a valve forming a part of said pump for controlling the flow of fluid to said second cylinder.

5. The structure of claim 4 and including flexible means supported adjacent to said end extremity of said elongated support.

6. The structure of claim 2 and including supporting handle means on said elongated support on longitudinally opposite sides of said pump.

References Cited
UNITED STATES PATENTS

| | | | |
|---|---|---|---|
| 3,213,605 | 10/1965 | Welden | 30—228 |
| 2,696,042 | 12/1954 | Wallace | 30—180 |
| 2,697,457 | 12/1954 | Lawrence | 30—228X |
| 2,750,666 | 6/1956 | Teagle | 30—231 |
| 2,814,872 | 12/1957 | Gerrans | 30—228 |

ROBERT C. RIORDON, Primary Examiner

J. C. PETERS, Assistant Examiner

U.S. Cl. X.R.

30—231